(12) United States Patent
Edge (10) Patent No.: US 11,561,004 B2
(45) Date of Patent: Jan. 24, 2023

(54) SYSTEM FOR REMOVING AND REPLACING FIRE-TUBES

(71) Applicant: CHARGER ENERGY SERVICES, LLC, Midland, TX (US)

(72) Inventor: Eddie Edge, Midland, TX (US)

(73) Assignee: CHARGER ENERGY SERVICES, Midland, TX (US)

( * ) Notice: Subject to any disclaimer, the term of this patent is extended or adjusted under 35 U.S.C. 154(b) by 0 days.

(21) Appl. No.: 17/474,597

(22) Filed: Sep. 14, 2021

(65) Prior Publication Data

US 2021/0404648 A1 Dec. 30, 2021

Related U.S. Application Data

(63) Continuation of application No. 15/344,305, filed on Nov. 4, 2016, now Pat. No. 11,118,780.

(60) Provisional application No. 62/251,127, filed on Nov. 5, 2015.

(51) Int. Cl.
*F22B 37/58* (2006.01)
*B23P 19/027* (2006.01)
*B23P 19/02* (2006.01)

(52) U.S. Cl.
CPC ............ *F22B 37/58* (2013.01); *B23P 19/022* (2013.01); *B23P 19/027* (2013.01)

(58) Field of Classification Search
CPC ........ F22B 37/58; B23P 19/027; B23P 19/022
See application file for complete search history.

(56) References Cited

U.S. PATENT DOCUMENTS

| 9,643,827 | B2 * | 5/2017 | Madron ................... B66F 9/185 |
| 11,118,780 | B2 | 9/2021 | Edge |
| 2017/0175999 | A1 | 6/2017 | Edge |

* cited by examiner

*Primary Examiner* — Rick K Chang
(74) *Attorney, Agent, or Firm* — Greenberg Traurig, LLP; Dwayne L. Mason; Sidney Persley (57) ABSTRACT

A system for removing and replacing fire-tubes. The system can include a powered system, a fire-tube puller coupled to said powered system. The fire-tube puller has a puller back which is coupled to a plug rest. A plug rest is approximately perpendicular to the puller back, and the fire-tube will rest upon the plug rest when the fire-tube is being removed or installed. The system can also include a stack adjuster which is coupled to the plug rest. The stack adjuster can couple to a stack so as to reposition the stack.

10 Claims, 7 Drawing Sheets

SYSTEM FOR REMOVING AND REPLACING FIRE-TUBES

PRIORITY

This application is a continuation of U.S. Non-Provisional application Ser. No. 15/344,305 filed on Jun. 22, 2017, entitled "SYSTEM AND METHOD FOR REMOVING AND REPLACING FIRE-TUBES", which itself claims the benefit and priority benefit, of U.S. Provisional Patent Application Ser. No. 62/251,127, filed Nov. 5, 2015, titled "SYSTEM AND METHOD FOR REMOVING AND REPLACING FIRE-TUBES," the disclosure of which is incorporated herein in its entirety.

BACKGROUND OF THE INVENTION

Technical Field

The present invention relates to a system and method for removing and installing fire-tubes.

Description of Related Art

A fire-tube boiler is a type of boiler in which hot gases from a fire pass through one or more tubes running through a sealed container of water. The heat of the gases is transferred through the walls of the tubes by thermal conduction, heating the water and ultimately creating steam. A fire-tube introduces heat into a vessel such as a tank.

As fire-tubes are used, they will eventually become plugged and need replacing. Replacing fire-tubes typically requires an extensive, time-consuming, and expensive, shut-down of the vessel. Then 3 or more men with a backhoe operator remove and replace the fire-tube. The process is very slow, labor intensive, and frequently, unsafe. Consequently, it is desirable to have a master, safer, and easier system and method of installing and removing fire-tubes.

BRIEF DESCRIPTION OF THE DRAWINGS

The novel features believed characteristic of the invention are set forth in the appended claims. The invention itself, however, as well as a preferred mode of use, further objectives and advantages thereof, will be best understood by reference to the following detailed description of illustrative embodiments when read in conjunction with the accompanying drawings, wherein:

DETAILED DESCRIPTION

Several embodiments of Applicant's invention will now be described with reference to the drawings. Unless otherwise noted, like elements will be identified by identical numbers throughout all figures. The invention illustratively disclosed herein suitably may be practiced in the absence of any element which is not specifically disclosed herein.

Figure 1:
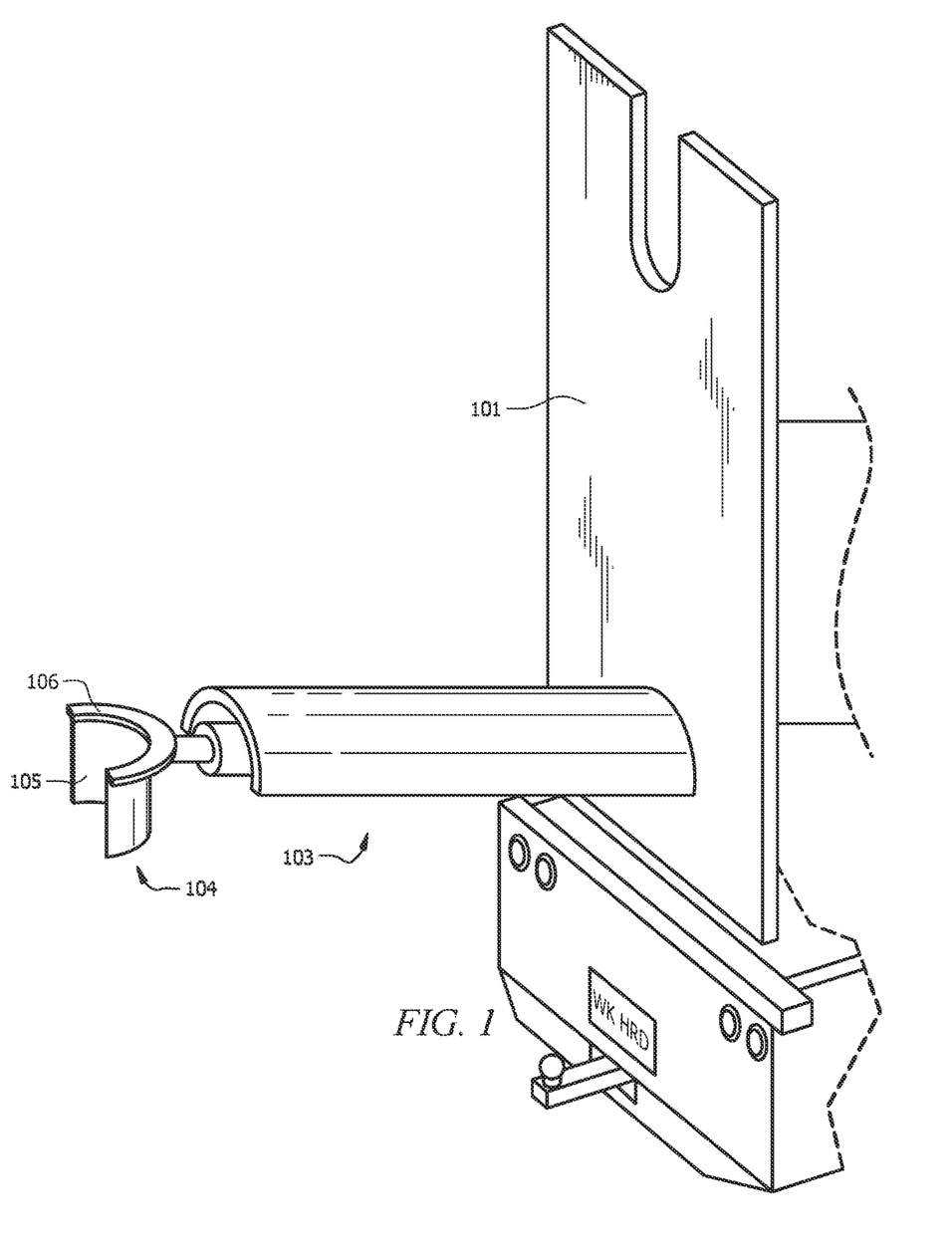
FIG. 1 is a perspective view of a fire-tube puller in one embodiment.
Figure 2:
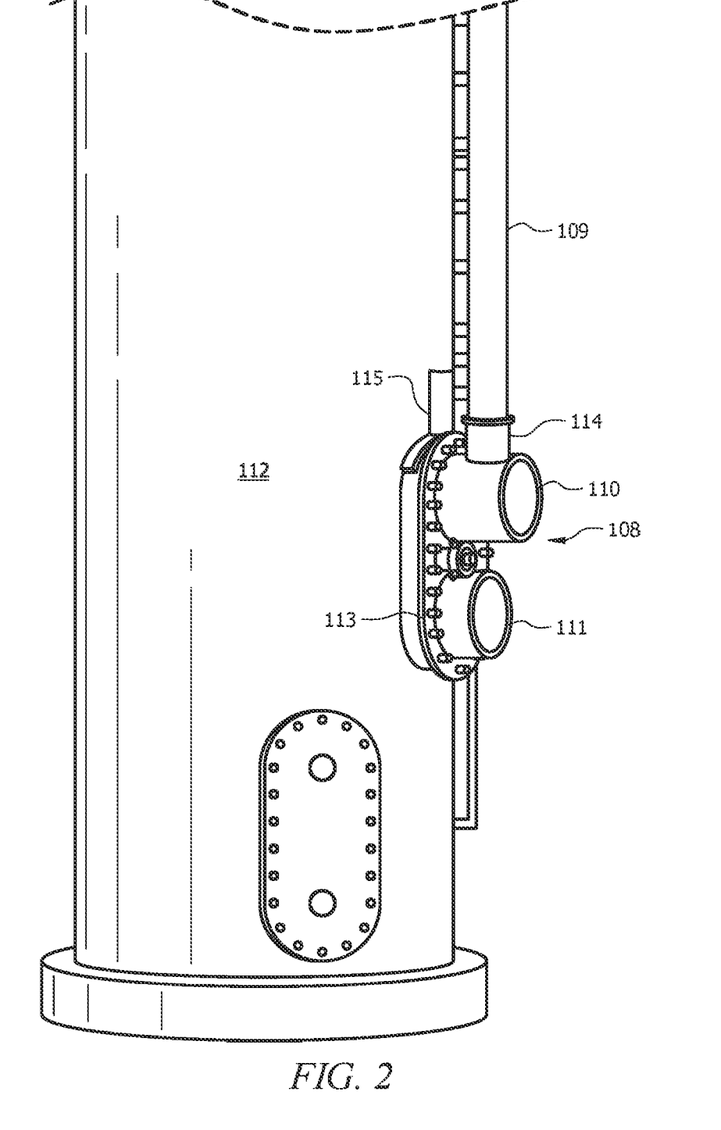
FIG. 2 is a perspective view of a fire-tube installed in a vessel in one embodiment.

FIG. 1 is a perspective view of a fire-tube puller in one embodiment. FIG. 2 is a perspective view of a fire-tube 108 installed in a vessel 112 in one embodiment. The coupling of the fire-tube puller 100, depicted in FIG. 1, to the fire-tube 108, depicted in FIG. 2, will be discussed in reference to both FIG. 1 and FIG. 2.

Turning first to FIG. 2, as noted, a fire-tube 108 is a type of boiler in which hot gases from a fire pass through one or more tubes. The tubes can contain water or other liquid such as oil. The fire-tube 108 is used to introduce heat into a vessel 112. As used herein, a vessel 112 refers to any tank or container used to store or process a material. The tubes can vary in size depending upon the specific application. The pipes can be in 10 inch, 14 inch, 16 inch, 24 inch, and 36 inch diameters, as well as larger and smaller diameters. The length can also vary depending upon the application. In some embodiments the tubes are 8 feet long before they turn in a U-shape. These sizes and dimensions are for illustrative purposes only and should not be deemed limiting.

The fire-tubes 108 can be vertically oriented, as depicted, or horizontally oriented. As depicted the fire-tube inlet 111 is located in a vertical alignment with the fire-tube outlet 110, and accordingly, the fire-tube 108 depicted comprises a vertically oriented fire-tube. In other embodiments, however, the fire-tube inlet 111 is located in a horizontal alignment with the fire-tube outlet 110. One skilled in the art will understand the various changes to the fire-tube puller 100 which may be necessary to accommodate the various fire-tube 108 alignments and orientations.

The fire-tube inlet 111 is the side in which fuel and/or fire is introduced into the fire-tube 108. Virtually any fuel, including natural gas, can be used. As noted, the size and capacity can vary depending upon the application. The fire-tube can range from about 250 BTU to about 5 MM BTU. In one embodiment the fire-tube 108 comprises one or more U-shaped tubes which couple to the fire-tube inlet 111 and travel to the inside of the vessel 112, then make a U-turn and travel to the fire-tube outlet 110 located outside of the vessel 112.

The fire-tube outlet 110 is fluidly coupled to a stack 109 which allows removal of off-gas and fumes. The fire-tube outlet 110 comprises a fire-tube exhaust 114 which is located atop the fire-tube outlet 110 and is coupled to the stack 109.

The fire-tube 108 is coupled to the vessel 112 via fire-tube connectors 113. The connectors 113 can comprise any method or device known in the art for coupling two pieces of equipment. This includes, but is not limited to, bolts, screws, clamps, oblong shot-gun flanges, etc.

Turning now to FIG. 1, a method and system of removing and replacing fire-tubes 108 will now be discussed. FIG. 1 depicts a fire-tube puller 100 which will couple to a fire-tube 108 as discussed below. The fire-tube puller 100 comprises a coupler which allows the fire-tube puller 100 to be coupled to a powered system. A powered system, as used herein, refers to any powered system which can control and direct movement of the fire-tube puller 100. In one embodiment the powered system can control and move the fire-tube puller 100 through three dimensions. The powered system can comprise for example, a hydraulic system, a pneumatic system, or other mechanical systems. In one embodiment the powered system is coupled to a moveable structure such as a truck, trailer, etc.

The fire-tube puller 100 can be coupled to a powered system via any method or device known in the art. In one embodiment the fire-tube puller 100 is removably coupled such that the powered system can couple to a different item or a dissimilar fire-tube puller 100. As used herein, "coupled" refers to two or more items being directly connected as well as two or more objects being connected indirectly.

The fire-tube puller 100, as depicted, comprises a puller back 101. The puller back 101 is coupled, directly or indirectly, to the powered system. The powered system applies a force to the puller back 101, and that is how the fire-tube puller 100 is moved and controlled. In one embodiment the powered system is coupled to a rear side of the puller back 101.

As depicted the fire-tube puller back 101 comprises a substantially planar piece. In one embodiment the puller back 101 comprises a substantially vertical piece. The puller back 101 can have virtually any dimensions. In one embodiment the puller back 101 is ¾" in thickness and is about 2 feet wide and 3 feet tall. In other embodiments the puller back 101 is greater than 2 feet in width and taller than 3 feet. Those skilled in the art will understand the dimensions can vary to match the fire-tubes.

The puller back 101 comprises one or more connector holes 102. The connector holes 102 couple a coupler (not depicted in FIG. 1) to the puller back 101. As but one example, in one embodiment the coupler comprises a curved bolt which can be placed around the fire-tube exhaust 114 and then secured to the puller back 101 through the connector holes 102 via any device known in the art. The curved bolt can be screwed or bolted to the puller back 101. In this fashion, the puller back 101 is removably coupled to the fire-tube exhaust 114. This helps stabilize and control the fire-plug 108 during removal and installation.

The fire-tube puller 100 can comprise virtually any material which is strong enough to support the weight of the fire-tube. In one embodiment the fire-tube puller 100 comprises aluminum, stainless steel, steel, titanium, and other metals and combinations thereof.

Coupled to the puller back 101 is the plug rest 103. In one embodiment the puller back 101 is approximately perpendicular to the puller back 101. In one embodiment the plug rest 103 is coupled to a front face of the puller back 101. The plug rest 103 can be coupled to the puller back 101 via any method or device known in the art. In one embodiment the plug rest 103 is welded to the puller back 101. In other embodiments the plug rest 103 and the puller back 101 are integrally made as a single piece.

The plug rest 103 sticks out from the puller back 101 such that the fire-plug 108 can rest upon the plug rest 103. In one embodiment, and as depicted, the plug rest 103 comprises a top portion which has a curved cross-section. In one embodiment the plug rest 103 comprises a semi-circular cross-section. More broadly, in one embodiment the plug rest 103 comprises a cross-section which complements the cross-section of the fire-tube inlet 111. As can be seen in FIG. 2, the fire-tube inlet 111 comprises a circular cross-section. Accordingly, when the plug rest 103 is inserted into the fire-tube inlet 111, the curved or semi-circular cross-section of the plug rest 103 matches the cross-section of the fire-tube inlet 111. This allows for maximum surface area contact during removal and installation. Increased surface area contact between the plug rest 103 and the fire-tube inlet 111 results in a more stable and controlled lifting.

The length of the plug rest 103 can vary. In one embodiment for fire-tube 108 having a length of about 6 feet, the plug rest 103 has a length of about 4 feet. As noted above, an increased length increases surface area contact and consequently increased in a more stable, controlled lifting.

In one embodiment, and as depicted, a stack adjuster 104 is coupled to the plug rest 103. The stack adjuster 104 is a device which allows the stack 109 to be engaged and positioned. As depicted the stack adjuster 104 comprises an adjuster lip 106 upon which the stack 109 sits. In one embodiment the stack adjuster 104 comprises a hitch attachment which further secures the stack 109 to the stack adjuster 104. As depicted the stack adjuster 104 comprises an adjuster body 105 which extends downward below the adjuster lip 106. In one embodiment the adjuster body 105 comprises a cross-sectional shape such that matches the external cross-sectional shape of the fire-tube exhaust 114. This allows the adjuster body 105 to surround the fire-tube exhaust 114 and stabilize around the fire-tube exhaust 114.

In one embodiment, the stack 109 is first decoupled from the fire-tube exhaust 114. This can be accomplished by removing bolts, screws, or whatever device is used to couple the fire-tube exhaust 114 and the stack 109. Once the stack 109 has been decoupled, the stack adjuster 104 is positioned adjacent the stack 109

Figure 3:
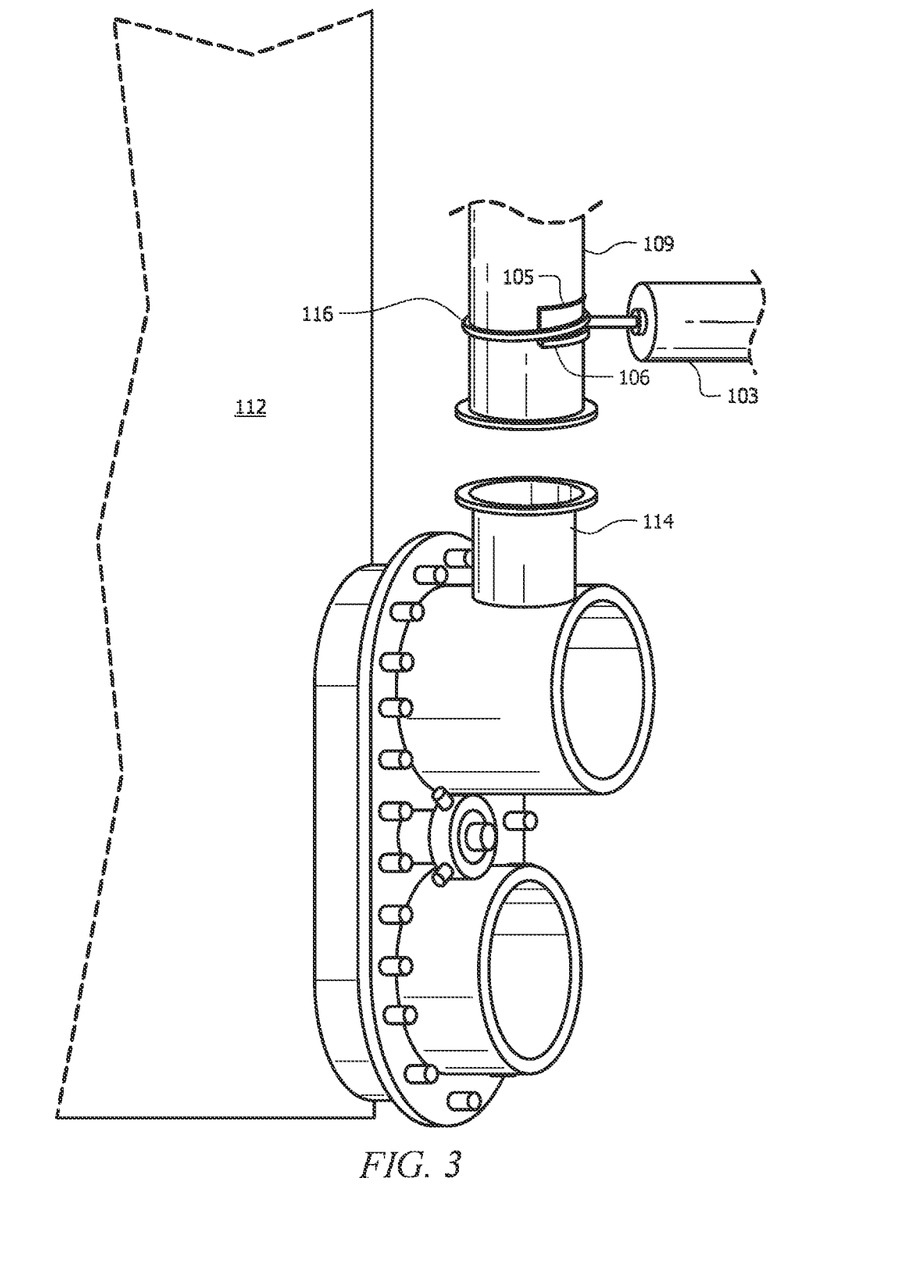
FIG. 3 is a perspective view of the stack adjuster in one embodiment.

FIG. 3 is a perspective view of the stack adjuster 104 in one embodiment. As can be seen, the stack 109 has been lifted from the fire-tube exhaust 114 via the stack adjuster 104. The adjuster lip 106 is positioned adjacent to the stack 109. Likewise, the adjuster body 105 is flush against the stack 109. Further securing the stack adjuster 104 to the stack 109 is a stack coupler 116. The stack 109 can be secured via the stack coupler 116 via chains, screws, or any device or method known in the art for removably coupling the stack 109 to the stack adjuster 104. This additional securement prevents the stack 109 from falling and causing damage or injury.

As depicted the adjuster body 105 is located atop the lip 106 which is different than depicted in FIG. 1. Either embodiment can be utilized.

Figure 4:
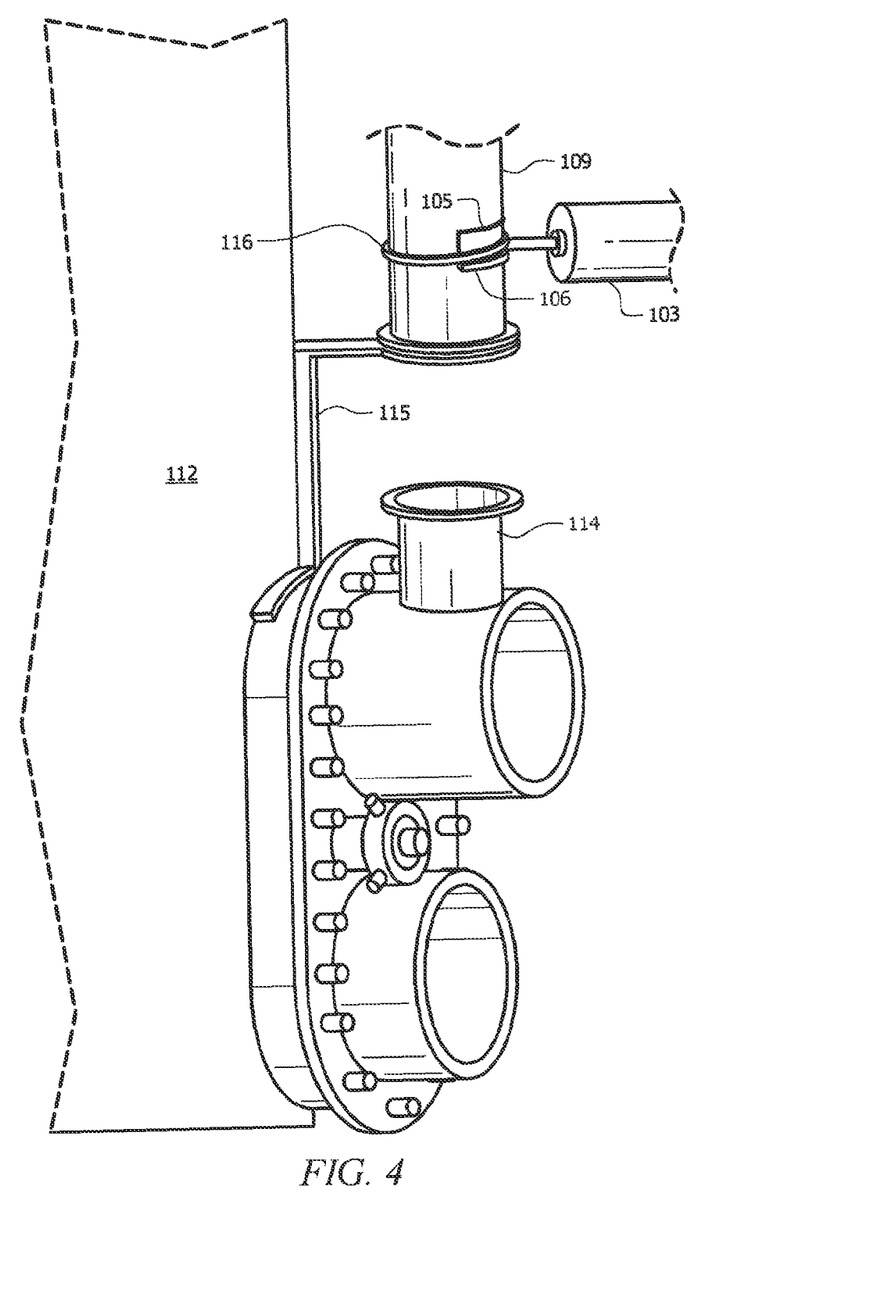
FIG. 4 is a perspective view of a stack rest in one embodiment.

In one embodiment, while the stack 109 is being controlled by the stack adjuster 104, the stack 109 is positioned to sit upon the stack rest 115. FIG. 4 is a perspective view of a stack rest in one embodiment. A stack rest 115, as used herein, refers to an item upon which the stack 109 can rest. As depicted, the stack rest 115 comprises an L-shaped member which is elevated relative to the fire-tube outlet 110. The vertical portion of the L-shaped member of the stack rest 115 provides an elevated distance. This allows the stack 109 to be raised vertically and then placed on the horizontal portion of the L-shaped member of the stack rest 115. Accordingly, when the fire-tube 108 has been replaced, the stack 109 can simply be lowered in its desired location adjacent to the fire-tube exhaust 114.

The stack rest 115 allows the stack 109 to be safely stored in a vertical position while the fire-tube 108 is being replaced. This saves time and labor compared to lowering the stack 109 such that it rests upon the ground, for example. Instead, the stack 109 is stored in a position above the fire-tube exhaust 114 such that it can quickly and safely be recoupled to the fire-tube exhaust 114.

As noted, in one embodiment the stack adjuster 104 can be removably coupled to the fire-tube puller 100. The stack adjuster 104 can be coupled at any point on the fire-tube puller 100. For example, the stack adjuster 104 can be coupled to the plug rest 103 as depicted. Being removably coupled allows the stack adjuster 104 to be removed and/or replaced when desired. As an example, in some embodiments the stack 109 may comprise a significantly larger or smaller diameter requiring a smaller or larger stack adjuster 104. In such situations, the stack adjuster 104 can simply be removed and recoupled as necessary.

Figure 5:
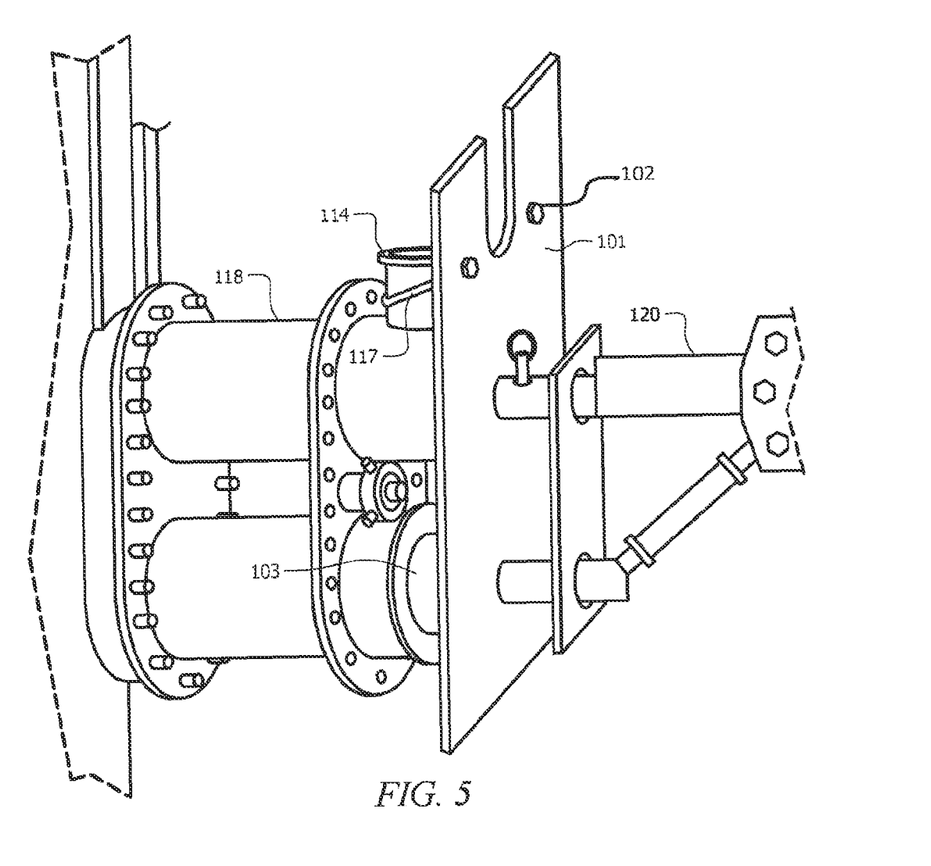
FIG. 5 is a perspective view of the puller engaging a fire-tube in one embodiment.

FIG. 5 is a perspective view of the puller engaging a fire-tube in one embodiment. As can be seen, the puller back 101 is engaging the fire tube 118. The fire-tubes 118, vertically oriented as depicted, are being removed from the vessel 112. As noted, the fire-tubes become plugged overtime and consequently need to be replaced. FIG. 5 shows the fire-plug 118 resting upon the plug rest 103. Thus, the majority of the weight of the fire-tube 118 is supported by the plug rest 103. The fire-tube 118 is further secured to the puller back 101 via the puller back coupler 117. As depicted, this comprises a U-shaped bolt, but this can be any fastening device such as a chain, wire, etc., discussed herein.

The fire-tube 118 is now secured to the puller back 101. The puller back 101 can then be manipulated and controlled as desired. As depicted the puller back 101 comprises hydraulics 120 which allow the puller back 101 to be tilted, angled, and positioned at its desired location.

The fire-tube 118 can be removed from the vessel and deposited at a desired location. Thereafter, the puller back 101 can be disengaged from the old fire-tube 118. The puller back 101 can then be positioned to engage a replacement fire-tube.

Figure 6:
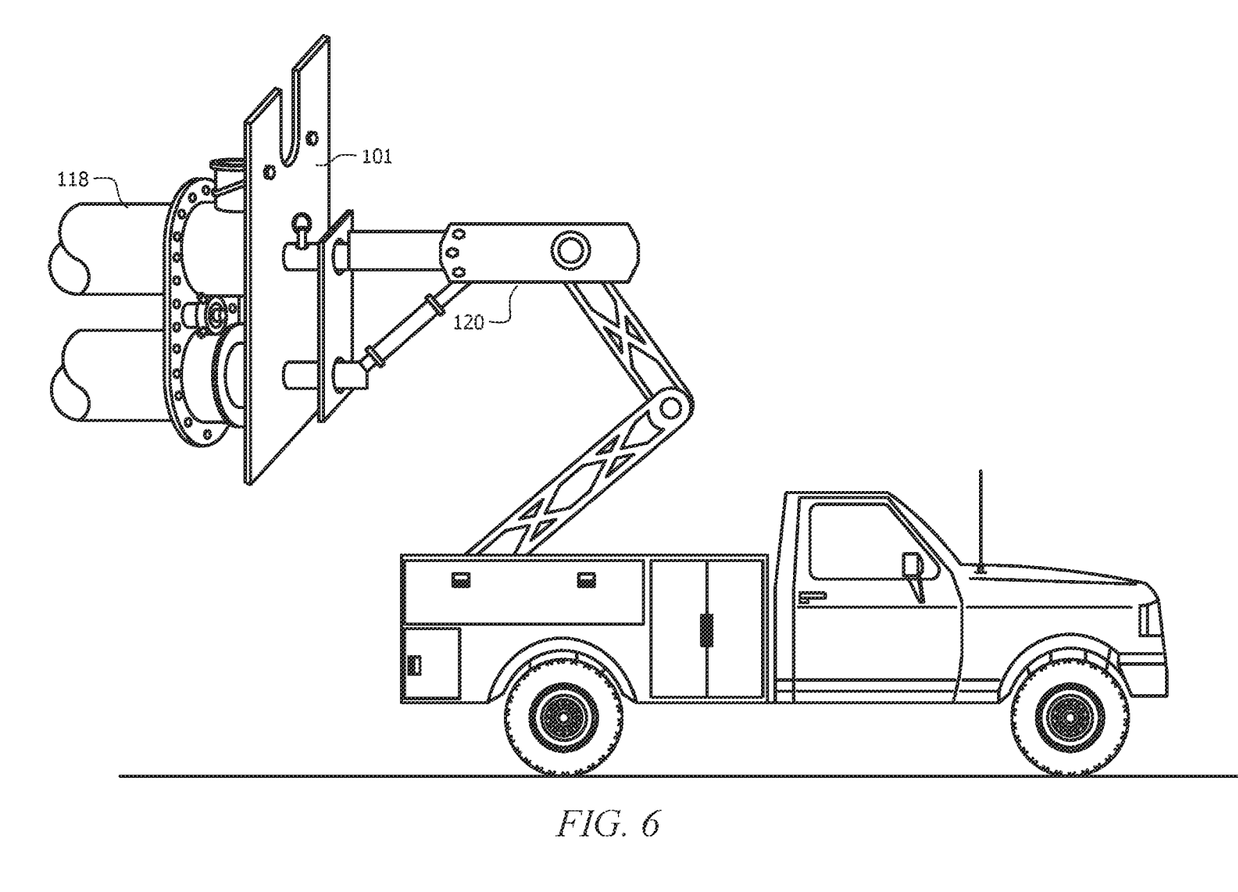
FIG. 6 shows a perspective view of a puller back engaging a replacement fire-tube.

FIG. 6 shows a perspective view of a puller back engaging a replacement fire-tube. As can be seen, the replacement fire-tubes are installed in the same manner in which the old fire-tubes were removed.

While one embodiment showing a stack adjuster 104 being coupled to the plug rest 103, this is for illustrative purposes only and should not be deemed limiting. In other embodiments other tools can be attached in place of the stack adjuster 104. One example of such a tool is a basket. This allows the fire-tube puller 100 to also function as a man-lift. In such embodiments the basket allows a human operator to be lifted and positioned as desired. As but one example, a human operator can be lifted to remove the connectors coupling the stack 109 to the fire-tube exhaust 114. Thereafter, the basket can be removed and the stack adjuster 104 can be installed to adjust and position the stack 109 as discussed. In one embodiment rather than replacing the stack adjuster 104, the basket or other tool adheres or attaches to the stack adjuster 104. In one embodiment the stack adjuster 104 is coupled to the plug rest 103 via a trailer hitch or the equivalent. This allows other tools, such as the basket described above, to the coupled to the plug rest 103.

Figure 7:
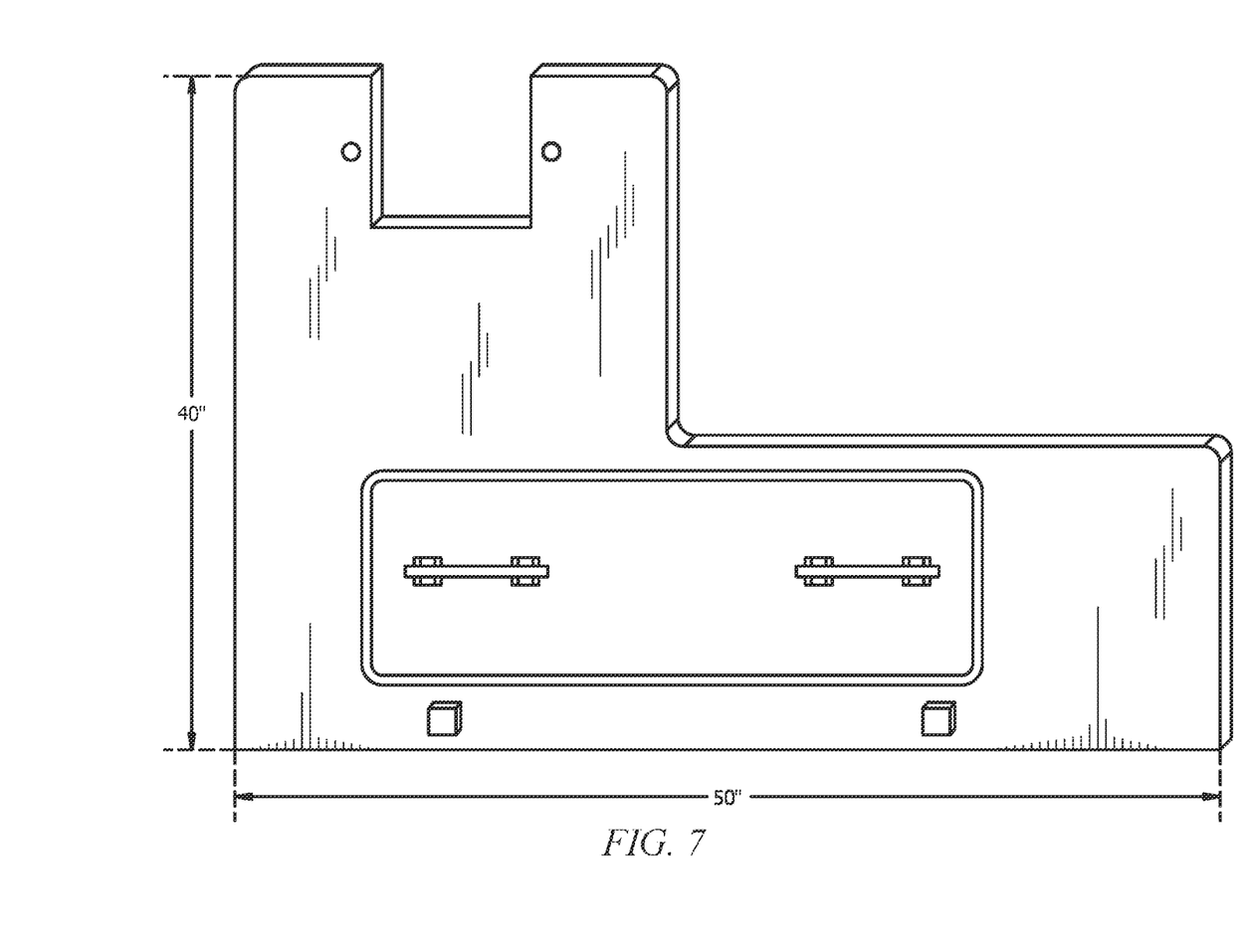
FIG. 7 is a perspective view of a horizontal puller back in one embodiment.

FIG. 7 is a perspective view of a horizontal puller back 101 in one embodiment. As noted, there are vertically oriented fire-tubes and horizontally oriented fire-tubes. FIG. 7 depicts one embodiment of a puller back which can be used on horizontally oriented fire-tubes. As can be seen, the puller back 101 also comprises a U-shaped void 107 which can be used to couple with the fire-tube exhaust 114. The puller back 101 can comprise one or two plug rests which will support the weight of the fire-tubes.

As depicted, the puller back 101 comprises two double hinges. This allows the puller back 101 to be tilted forward and back. In one embodiment the puller back 101 can be moved, tilted, and/or rotated in three dimensions.

While a system for removing and installing fire-tubes in one embodiment has been described, a method of using the system will now be described in reference to one embodiment. First, heat and the fuel source is removed from the fire-tube rendering it inoperable. Second, any cover atop the fire-tube inlet 111 is removed. Thereafter, the stack 109 is decoupled from the fire-tube exhaust 114. As noted, this can be accomplished by removing bolts, screws, or whatever device is used to couple the fire-tube exhaust 114 and the stack 109. After the stack 109 has been decoupled, the stack adjuster 104 is positioned at the base of the stack 109. The stack adjuster 104 is manipulated such that the stack 109 is adjacent to the stack adjuster 104. The stack 109 is then coupled via the stack coupler 116. The stack adjuster 104 is then lifted to be adjacent to the stack rest 115 and lowered as necessary such that the stack 109 rests upon the stack rest 115. Optionally, the stack 109 is secured to the stack rest 115 via any method device known in the art or discussed herein.

Once the stack 109 is resting safely upon the stack rest 115, the fire-tube 108 can be removed. If not already removed, the fire-tube couplers 113 are removed such that the fire-tube 108 is not attached to the vessel 112. At this point, the fire-tube puller is positioned adjacent to the fire-plug 108. Thereafter the fire-tube puller 100 is pushed toward the vessel 112 such that the plug rest 103 enters the cavity of the fire-tube inlet 111. In one embodiment, the stack adjuster 104 is sized so as to fit within the cavity of the fire-tube inlet 111.

The fire-tube puller 100 is pushed relative to the fire-tube 108 such that the puller back 101 is adjacent the fire-tube exhaust 114. At this point a coupler is attached via the connector holes 102. This results in the fire-tube exhaust 114 being coupled to the puller back 101.

The fire-plug 108 is now secured to the fire-tube puller 100. The fire-plug 108 is secured by the plug rest 103 and the coupler 117 which connects the fire-tube exhaust 114 to the puller back 101. A rearward force is applied to the fire-tube puller 100, and consequently, the fire-tube 108, and the fire-tube 108 is withdrawn from the vessel.

The fire-tube puller 100 is positioned in a desired location, whether on the ground, in a truck, on a trailer, etc. to deposit the removed fire-tube 108. The fire-tube puller 100 is then decoupled from the removed fire-tube 108. Specifically, in one embodiment, the coupler is removed, and the plug rest 103 is withdrawn from the fire-tube inlet 111 cavity. The fire-tube puller 100 is now free to couple to a new fire-tube 108, and the process is repeated. Namely, in one embodiment, the fire-tube puller 100 is positioned such that the fire-tube 108 is inserted into the vessel 112. The fire-tube couplers are reconnected to secure the fire-tube 108 within the vessel 112. Then the couplers are removed so that the new fire-tube 108 is no longer connected to the fire-tube puller 100. At this point, the stack adjuster 104 is positioned to grasp and control the stack 109 down to the fire-tube exhaust 114. The stack 109 is then reconnected to the fire-tube exhaust 114. Thereafter, the fire-tube inlet 111 is reconnected to the fuel, fire, etc.

As noted, the method for removing and installing a fire-tube 108 is much faster and safer than prior art methods which involved multiple people and unsuitable tools such as a backhoe. A backhoe, absent a connecting tool such as the fire-tube puller 100 described herein, does not allow for the safe and stable connection of the backhoe to the fire-tube. Consequently, the removal and installation of fire-tubes was very slow, deliberate, unsafe, and required extensive downtime for the vessel. In an industry where downtime can result in significant opportunity costs, a decrease in downtime can result in substantial savings. The prior art method of removing and installing a fire-tube resulted in a downtime of about 2 days. However, the method discussed herein results in a downtime of 4.5 hours or less for the removal and installation of a new fire-tube. As noted, this is a considerable reduction in downtime.

Furthermore, the prior art method required that the backhoe be able to be adjacent to the fire-plug. Many vessels are surrounded by fences such as safety fire walls. These fire walls would previously have to be removed to allow installation of the new fire-tube and then subsequently rebuilt. This results in undesired waste in capital and labor. However, in one embodiment the powered system has a 6,000 pound lift capacity. Accordingly, the powered system can be positioned on the outside of the fire wall and remove and install fire-tubes located within the fire wall. As such, there is no need to remove the fire wall during installation of the fire-tubes.

As noted above, in one embodiment the removal and installation of a new fire-plug can be completed in less than 4.5 hours compared to the previous time of 2 days. Because of this, a new method of deploying and providing fire-plugs has been developed.

In one embodiment a mobile system is used to transport and carry the powered system, the fire-tube puller, and at least one fire-tube to a job site. In one embodiment a mobile system can comprise any system which can carry the necessary equipment and can include a truck, a trailer, etc.

In one embodiment the mobile system comprises two or more fire-tubes. Carrying additional fire-tubes increases the chances that the mobile system will have the correct fire-tube. In this manner, the mobile system can depart fully loaded with a plurality of fire-tubes and drive from customer to customer replacing fire-tubes. For example, in one embodiment in response to a request from a first customer, the mobile system will depart carrying the required replacement fire-tube. Because the time frame for removing and replacing the fire-tube is 4.5 hours, if, while working on the fire-tube for the first customer, a second customer calls, the mobile system, once installation of the fire-tube for the first customer is completed, can thereafter depart for the second customer. If the mobile system is equipped with the size and type of fire-tube required by the second customer, then the mobile system need not return to obtain the fire-tube but instead can travel directly to the second customer. As noted, this has a benefit of further decreasing the downtime associated with replacing a plugged or otherwise inoperable fire-tube.

In one embodiment the mobile system comprises a plurality of fire-tubes such that the mobile system can remain in the field for several days before returning to a launching base to acquire additional fire-tubes. In some embodiments, additional fire-tubes are stored at a launching base. In other embodiments, however, rather than return to a launching base, the mobile system can obtain additional fire-tubes at remote locations such as retail sites and other fire-tube providers.

The system described above is a paradigm shift from the current method of replacing fire-tubes. As noted, currently a customer would call for a replacement tube, the operator would obtain the replacement fire-tube, and coordinate a two day shut-down of the vessel. Now, however, if a customer's fire-tube becomes plugged or otherwise inoperable, the customer can send word to the mobile system, and the mobile system can replace the fire-tube often in the same day.

In one embodiment the mobile system is equipped with the most common type of fire-tubes. This increases the likelihood that a customer's required fire-tube will be located on the mobile system, increasing the speed in which the mobile system can replace the fire-tube.

While the invention has been particularly shown and described with reference to a preferred embodiment, it will be understood by those skilled in the art that various changes in form and detail may be made therein without departing from the spirit and scope of the invention.

ADDITIONAL DESCRIPTION

The following clauses are offered as further description of the disclosed invention.

Clause 1. A system for removing and installing a fire-tube, said system comprising:
  a powered system;
  a fire-tube puller coupled to said powered system, wherein said fire-tube puller comprises a puller back coupled to a plug rest.

Clause 2. The system of any proceeding or preceding claim wherein said puller back is approximately perpendicular to said plug rest.

Clause 3. The system of any proceeding or preceding claim further comprising a stack adjuster.

Clause 4. The system of any proceeding or preceding claim wherein said stack adjuster is coupled to said plug rest, and wherein said stack adjuster comprises an adjuster lip and an adjuster body.

Clause 5. The system of any proceeding or preceding claim wherein said stack adjuster is removably coupled to said plug-rest.

Clause 6. The system of any proceeding or preceding claim further comprising a mobile system which transports said powered system, said fire-tube puller, and at least one fire-tube.

Clause 7. The system of any proceeding or preceding claim wherein said puller back comprises a void located at its top, and wherein said puller back further comprises a puller back coupler which is used to engage with a portion of a fire-tube, and wherein said stack adjuster comprises a stack coupler which is used to engage a stack.

Clause 8. The system of any proceeding or preceding claim wherein said fire-tube puller comprises a vertically oriented fire-tube puller.

Clause 9. The system of any proceeding or preceding claim wherein said fire-tube puller comprises a vertically oriented fire-tube puller.

Clause 10. The system of any proceeding or preceding claim wherein said powered system is coupled to a truck.

Clause 11. The system of any proceeding or preceding claim wherein said powered system comprises a hydraulic system.

Clause 12. A method of removing and installing a fire-tube, on a system, said system comprising"
  a powered system;
  a fire-tube puller coupled to said powered system, wherein said fire-tube puller comprises a puller back coupled to a plug rest;
  an adjuster is coupled to said plug rest, and wherein said stack adjuster comprises an adjuster lip and an adjuster body.
  said method comprising the following steps:
  a) removing a cover on a fire-tube;
  b) decoupling a stack from a fire-tube exhaust;
  c) coupling the stack to said adjuster;
  d) repositioning said stack;
  e) positioning said fire-tube puller adjacent said fire-plug;
  f) withdrawing fire-tube;
  g) removing said fire-tube from said fire-tube puller;
  h) positioning said fire-tube puller adjacent a new fire-tube;
  i) installing said new fire-tube.

Clause 13. The method of any proceeding or preceding claim wherein said repositioning said stack comprises placing said stack on a stack rest.

Clause 14. The method of any proceeding or preceding claim wherein said positioning of step e) comprises inserting said plug rest into a cavity within said fire-tube, such that said fire-tube rests on said plug rest.

Clause 15. The method of any proceeding or preceding claim wherein said coupling of step c) comprises positioning said adjuster body at least partially around said stack and securing said adapter to said stack with a stack coupler.

Clause 16. The method of any proceeding or preceding claim wherein said positioning of step e) comprises coupling said puller back to a fire-tube exhaust.

What is claimed is:

1. A vehicle mounted firetube removal and installation system comprising:
   a vehicle mounted arm with a distal end adapted to move in a vertical and horizontal direction;
   a puller back having a distal side and a proximal side, the proximal side being connected to the distal end of the arm by double hinges;
   a first plug rest having a proximal end and a distal end, the proximal end being connected to the distal side of the puller back;
   a second plug rest parallel to the first plug rest, having a proximal end and a distal end, the proximal end being connected to the distal side of the puller back; wherein the first and second plug rest are further being adapted for insertion into a firetube;
   a stack adjuster configured to be connected to the distal end of the first plug rest and adapted to decouple a stack from a fire-tube having a fluidly coupled and removable stack extending from a fire-tube exhaust of the firetube;
   a powered system adapted to move the arm in a vertical, horizontal, proximal, and distal direction.

2. The system of claim 1, wherein the powered system moves the arm hydraulically.

3. The system of claim 1, wherein the powered system moves the arm pneumatically.

4. The system of claim 1, wherein the powered system is adapted to position the plug rest for removal or installation of a vertically oriented firetube.

5. The system of claim 1, wherein the powered system is adapted to position the plug rest for removal or installation of a horizontally oriented plug rest.

6. The system of claim 1, further comprising a coupler secured to the puller back and extending distally from the puller back, the coupler adapted to secure the firetube exhaust.

7. The system of claim 1, wherein the stack adjuster is removable.

8. The system of claim 1, wherein the powered system is adapted to lift the firetube up to 6000 lbs.

9. The system of claim 1, wherein the puller back comprises two double hinges.

10. The system of claim 1, wherein the puller back is adapted to be removably coupled to the firetube exhaust.

* * * * *